United States Patent

[15] 3,644,667

[45] Feb. 22, 1972

Shimotsuma et al.

[54] APPARATUS FOR DISPLAYING A TEMPERATURE DISTRIBUTION PATTERN

[72] Inventors: Teruo Shimotsuma; Toshihiro Mori; Kazuo Sano, all of Yokohama-shi; Seigo Ando, Kawasaki-shi, all of Japan

[73] Assignee: Nippon Kokan Kabushiki Kaisha, Tokyo, Japan

[22] Filed: June 11, 1969

[21] Appl. No.: 832,219

[30] Foreign Application Priority Data

June 15, 1968 Japan ....................43/41009

[52] U.S. Cl. ..........178/6.8, 178/DIG. 8, 178/DIG. 34, 178/5.4

[51] Int. Cl. ..........H04n 7/18

[58] Field of Search ..........178/6.8, 5.4, DIG. 8, 34

[56] References Cited

UNITED STATES PATENTS

| | | | |
|---|---|---|---|
| 3,379,830 | 4/1968 | Menke | 178/6.8 |
| 2,730,566 | 1/1956 | Barton et al. | 178/5.4 |
| 2,982,814 | 5/1961 | Fine et al. | 178/6.8 |
| 2,971,093 | 2/1961 | Garbuny | 178/DIG. 8 |

*Primary Examiner*—Robert L. Richardson
*Assistant Examiner*—Barry Leibowitz
*Attorney*—George B. Oujevolk

[57] ABSTRACT

An apparatus for displaying a temperature distribution pattern which comprises means for obtaining from a television camera device signals having amplitudes corresponding to the respective temperature zones involved in the temperature distribution pattern of a foreground subject, means for dividing these signals into several groups according to said temperature zones and means for displaying on the color television image receiving tube a hue distribution pattern corresponding to the respective groups of divided signals.

2 Claims, 12 Drawing Figures

Figure 1:
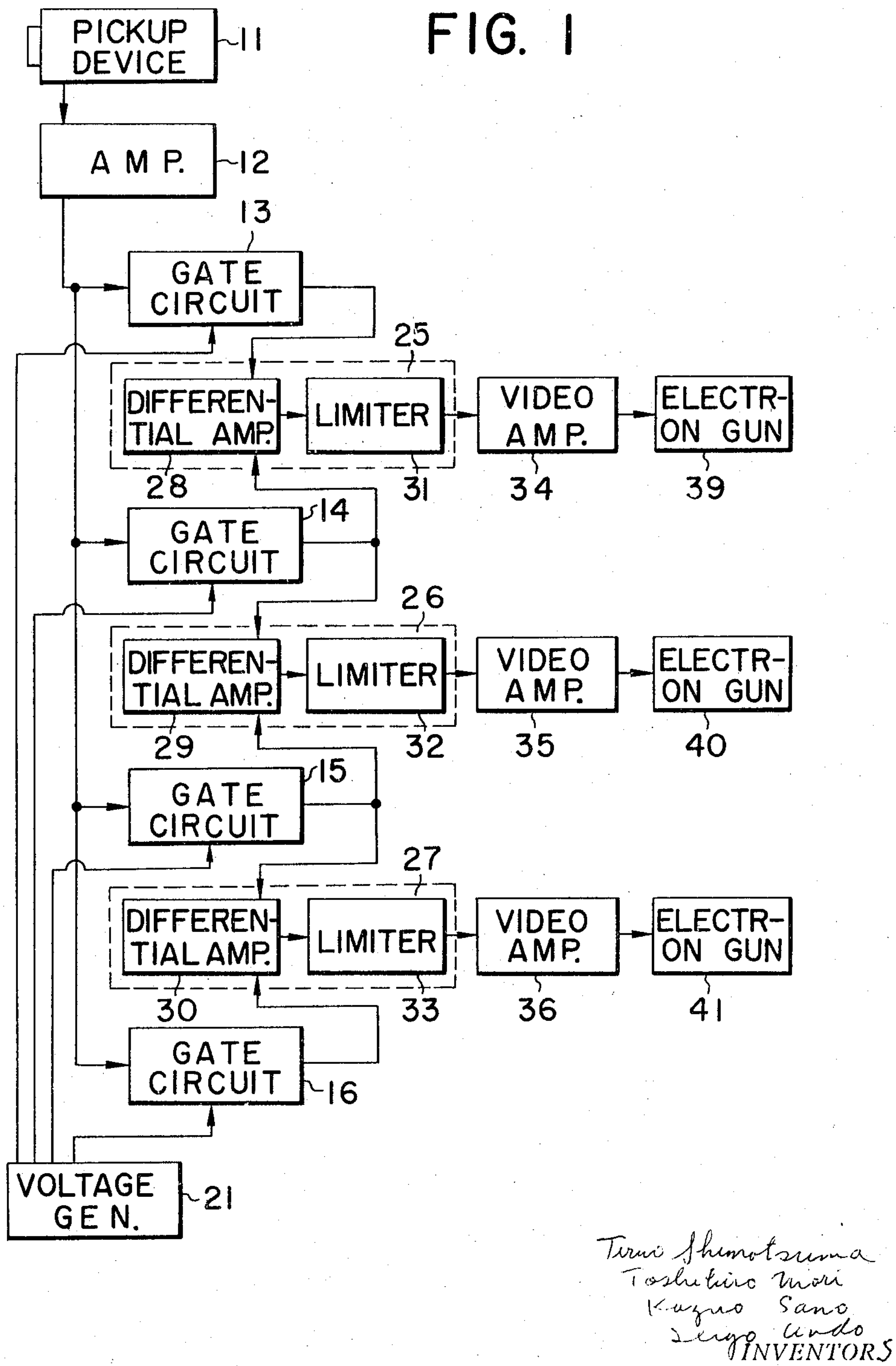

Toru Shimotsuma
Toshihiro Mori
Kazuo Sano
Seigo Ando
INVENTORS

BY George B. Oujevolk
Attorney

INVENTORS

BY

Attorney

INVENTORS

BY

Attorney

Teruo Shimotsuma
Toshihiro Mori
Kazuo Sano
Seigo Ando
INVENTORS

BY George B. Oujevolk
Attorney

APPARATUS FOR DISPLAYING A TEMPERATURE DISTRIBUTION PATTERN

The present invention relates to an apparatus for displaying a temperature distribution pattern using an industrial color television apparatus which comprises causing the temperature distribution pattern of a foreground subject to be presented in the form of a hue distribution pattern.

Generally, a heated object radiates heat at the rate defined by its surface temperature and its emissivity.

When radiated heat rays are picked up by a television camera and focused on the sensitized plane of an image pickup device used in a vidicon or the like through the optical lens system of said camera, then there is obtained on said sensitized plane a charged image corresponding to a temperature distribution pattern associated with the heat radiation of a foreground subject as picked up by said television camera. Namely, a temperature distribution pattern corresponding to the heat radiated from the surface of said foreground subject is taken out in the form of television image signals to be presented on an image receiving tube. With respect to the image obtained in the form of a temperature distribution pattern, there have been proposed various apparatus which consist in producing light intensity corresponding to a temperature distribution of a foreground subject, indicating isothermal lines associated with said temperature distribution or exhibiting the temperature zone of said subject defined by two isothermal lines.

However, the apparatus which displays said temperature distribution pattern in the form of variations in light intensity is handicapped by the practical difficulty of distinguishing a large number of stages of said intensity by an ordinary color television image receiving device. It is deemed an allowable limit with such device to recognize the high and low-temperature zones of a foreground subject simply by comparison. Namely, it is impossible truthfully to indicate the actual temperature distribution pattern of said subject. Also the apparatus which presents a temperature zone using isothermal lines can not permit the values of respective temperature zones involved in the presented temperature distribution pattern to be visually observed, nor a plurality of different temperature zones to be displayed at the same time.

It is accordingly the object of the present invention to make further improvements in the aforementioned drawbacks encountered with the prior art apparatus and provide an apparatus for displaying a temperature distribution pattern which consists in distinguishing by hue a plurality of different temperature zones involved in the temperature distribution pattern of a foreground subject and presenting at the same time on a color television image receiving device various hues corresponding to the values of the respective temperature zones.

An apparatus for displaying a temperature distribution pattern according to the present invention comprises a television camera device having a sufficient sensitivity to heat rays radiated from a foreground subject which fall within the range of its temperatures to be detected thereby to produce image signals corresponding to the respective temperature zones involved in the temperature distribution pattern of said subject, a means for dividing image signals from said camera device into a plurality of groups in corresponding relationship to said temperature zones and a means for displaying on a color television image receiving device a pattern of desired hues corresponding to said groups of divided signals.

Figures 2A, 2B, 2C, 2D:
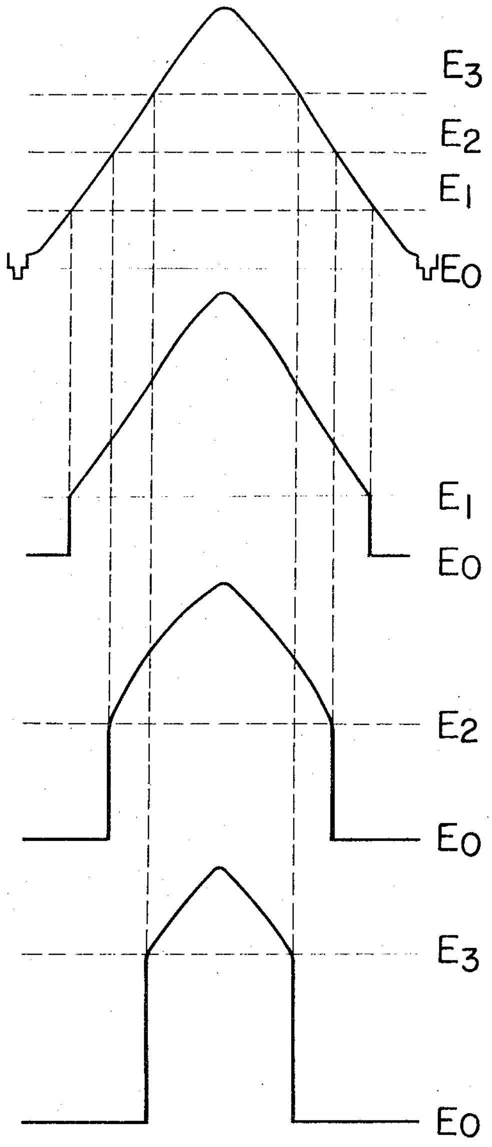
Figures 2E, 2F, 2G, 2H, 2I, 2J:
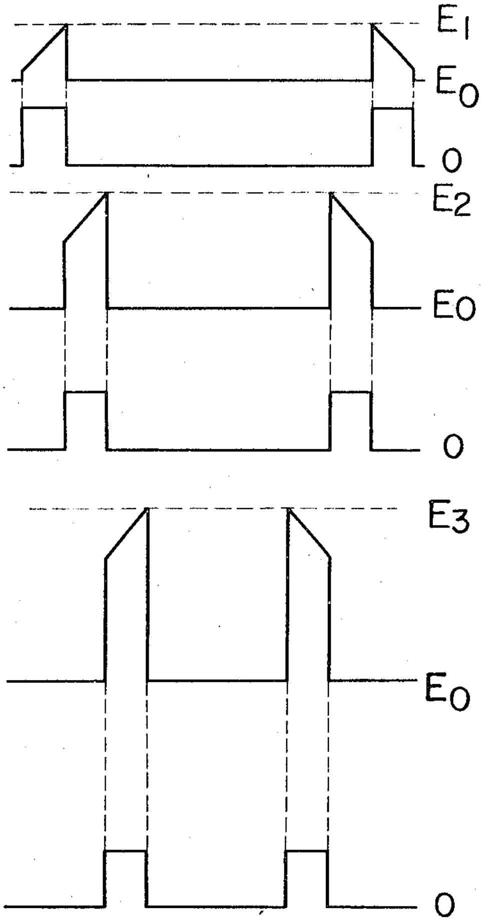
Figure 3:
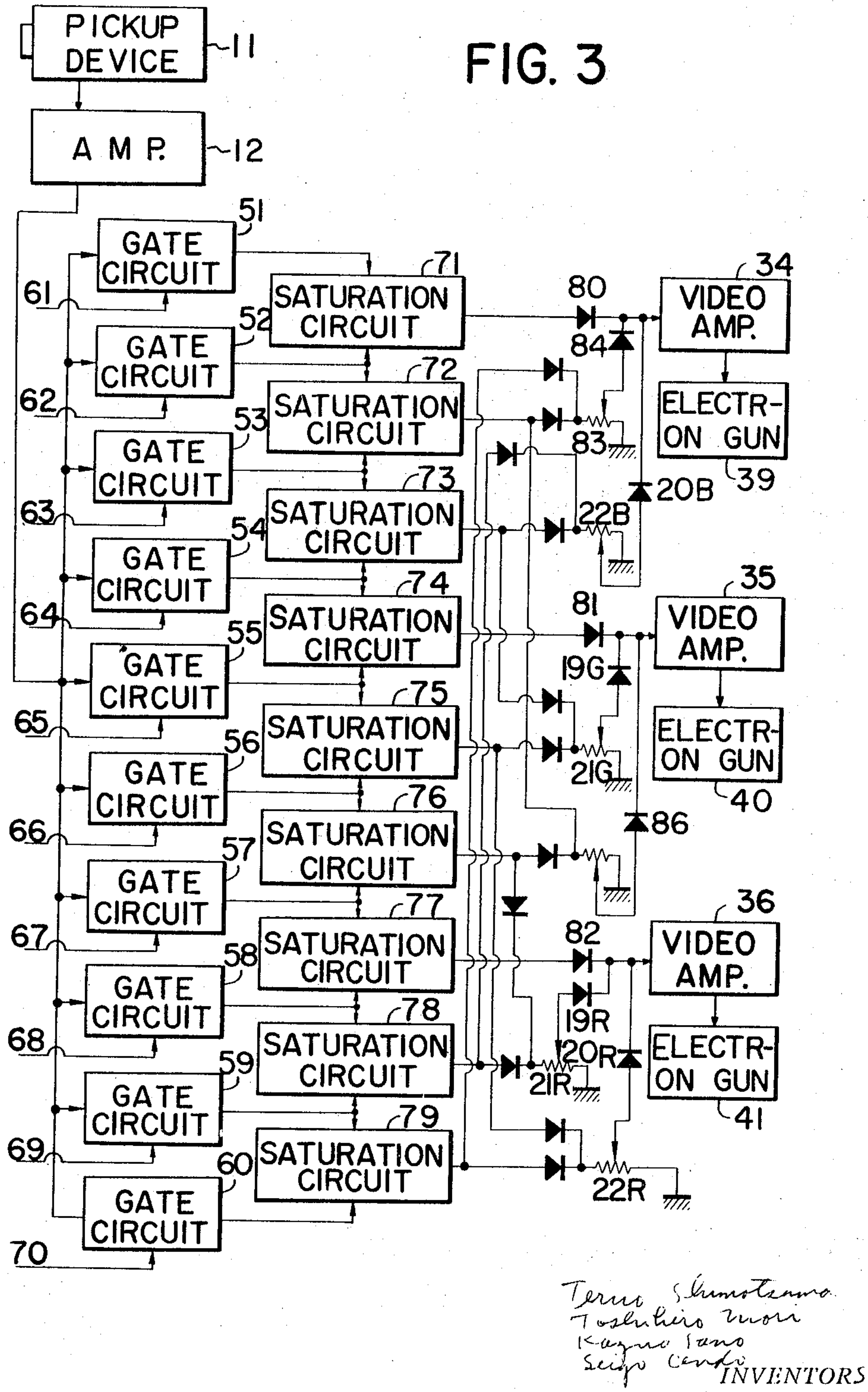

This invention can be more fully understood from the following detailed description when taken in connection with reference to the accompanying drawings, in which:

FIG. 1 is a circuit diagram of an apparatus for displaying a temperature distribution pattern according to an embodiment of the present invention;

FIGS. 2A to 2J respectively show the waveforms of signals illustrating the operation of said circuit; and FIG. 3 is a circuit diagram according to a modification of the aforesaid embodiment.

The image group device of the invention contains an infrared camera tube sensitive to infrared radiation, for example, an infrared vidicon. An infrared vidicon is a camera tube with a photolayer sensitive to infrared radiation, which is formed of, e.g., lead, cadmium sulphide or lead oxide. The resistance variations of the photolayer by heat radiation cause a change in the charged distribution of a charged image appearing on an image pickup device according to the temperature distribution pattern of a foreground subject. Said charged image is formed on a plan.

Each pictorial element of said charged image is supplied with a value of temperature information respectively according to the temperature of the corresponding portion of said subject.

Accordingly, the intensity and colors of pictorial elements appearing on said image pickup device for reproducing image signals taken out of said vidicon are only required to match variations in the values of said information. Originally, colors appeal to the human senses with values of ternary dimensional information. The nature of the present invention primarily consists in displaying changes in the temperature distribution pattern of a foreground subject in the form of most easily distinguishable hues. For example, the apparatus indicates various hues between violet and red hues having dominant wavelength of 400 to 700 millimicrons with respect to temperatures ranging between 200° to 600° C. to be detected and distinguished.

There will now be described an embodiment of the present invention by reference to the appended drawings. There are various means available for dividing a given temperature distribution pattern into a plurality of temperature zones and matching different colors with the respective zones. However, considering the ease of distinguishing colors and required correspondence of one color to one temperature zone, it is deemed most advisable to adopt the hue from among the three attributes of colors, namely, brightness, saturation and hue. Adoption of the hue also offers many advantages from the standpoint of the techniques of preparing a circuit. If the temperature distribution pattern of a foreground subject is distinguished on the basis of the hue, said distinguishment will be little affected, even though there may occur some variations in the other two attributes of colors, namely, brightness and saturation. Accordingly, adoption of the hue is effective in accurately reading said temperature distribution pattern.

There will now be described the hue procedure. The range of temperatures from $T_1$ to $T_2$ (assuming $T_1<T_2$) to be determined is divided into an n number of stages or groups and there are apportioned thereto also an *n* number of hues. For example, with respect to a temperature distribution pattern extending from $T_1$ to $T_2$, there are allotted violet → yellow → red → violet hues arranged in the order mentioned in a manner to substantially complete a color circle. Obviously, such arrangement will enable one hue to correspond to one temperature zone.

Generally, the inner surface of the image producing plane of a color television Braun tube is coated with fluorescent materials displaying light beams bearing three primary colors of red, green and blue and electron beams emitted from three assembled electron guns are made to impinge on said fluorescent materials so as to produce said light beams bearing three primary colors. The pictorial elements presented on the screen consist of a combination of the three primary colors. The release of electron beams from the three assembled electron guns to cause said fluorescent materials to send forth light is mainly controlled by the potential across the cathode and the first grid electrode. If, therefore, said potential is made to correspond to the temperatures detected, then it will be possible to represent the respective temperature zones involved in the temperature distribution pattern by hue.

FIG. 1 presents a basic embodiment of the present invention. A foreground subject, whose temperature distribution pattern is to be detected, is placed in the field of vision of a pickup device 11, for example, an industrial television camera. On the image pickup plane of the image pickup tube, for example, vidicon of said device 11 is focused an image resulting from heat rays radiated from said foreground subject. Thus from the pickup device 11 are taken out image signals are shown in FIG. 2A which correspond to the temperature distribution pattern of said foreground subject, in such a manner that the levels of said signals match the respective temperature zones. Thereafter the signals are supplied to a preamplifier 12 disposed in the foremost part of the temperature distribution detecting apparatus. The image signals led out from the preamplifier 12 are conducted to first to fourth gate circuits 13, 14, 15 and 16. These gate circuits 13 to 16 are intended to discriminate the image signals from each other according to the height of their waves using first to fourth control signals appearing on lead lines 17 to 20 from a generator 21 of voltages representing isothermal lines thereby to divide the range of temperatures into several groups by the level lines $E_o$ to $E_3$ of FIG. 2A. Thus there is taken out from the first gate signal 13 an image signal of an isothermal line as shown in FIG. 2A which corresponds to the lower limit level $E_o$ of the lowest temperature zone and thereafter from the second to fourth gate signals 14, 15 and 16 by turns image signals of isothermal lines having waveforms as shown in FIGS. 2B, 2C and 2D which respectively correspond to higher temperature zones. Namely, an image signal is made to correspond to the magnitude of temperature to be detected and there is made a comparison between the level of said signal and the voltage thereof taken out through the lead lines 17 to 20 from the isothermal voltage generator 21. An image signal having a higher level than the aforementioned one is taken to represent said isothermal line.

Referring to the isothermal image signals corresponding to different temperature zones which were taken out of the gate circuits 13 to 16, three groups of two adjacent signal components as shown in FIGS. 2A to 2D are supplied to first to third saturating circuits 25 to 27. These saturating circuits 25 to 27 consist of differential amplifiers 28 to 30 and limiters 31 to 33 respectively and are made to correspond to three primary colors blue, green and red. Image signals corresponding to the ribbon-shaped portions defined by every two adjacent ones of the aforesaid four isothermal signals are amplified by the differential amplifiers 28 to 30 to obtain differential signals as shown in FIGS. 2E, 2G and 2I. Said differential signals are allowed to pass through the limiters 31 to 33 to have their amplitude limited, obtaining as a result such signals as shown in FIGS. 2F, 2H and 2J. Output signals from the saturating circuits 25 to 27 are amplified by video signal amplifiers 34 to 36 and then conducted to three electron guns 39 to 41 corresponding to the three primary colors of images presented on a color television image receiving device to cause electron beams to be emitted therefrom in corresponding relationship to the video signals thus obtained.

At the moment there is issued from the pickup device an output of the video signal which corresponds to the lowest temperature zone of the divided temperature range, there is introduced an input only to the image signal amplifier 34, causing the electron gun 39 adjacent thereto to be actuated. When, therefore, scanning of the camera means of the pickup device 11 and that of the pickup tube are synchronized, then an image corresponding to the lowest temperature zone is indicated, for example, in a hue of blue.

Accordingly, those portions of an image presented on the screen which correspond to three temperature zones involved in the detected temperature distribution pattern are indicated in a combination of three hues at the same time, thus enabling momentary changes in the temperature distribution pattern to be distinctly observed, and also the four isothermal lines constituting the borders of the respective temperature zones to be easily displayed at the same time.

FIG. 3 is a modification of the apparatus for displaying the temperature distribution pattern according to the present invention where the number of temperature zones is increased to nine. The same parts of the modification as those of the foregoing embodiment are denoted by the same numerals. As in the preceding case, the temperature distribution pattern of a foreground subject is received by the pickup device 11. The resultant signals are amplified by the preamplifier 12 and then supplied to first to tenth gate circuits 51 to 60. These gate circuits 51 to 60 are controlled, as in FIG. 1, by signals from lead lines 61 to 70 extending from an isothermal voltage generator (not shown). There are taken out video signals representing 10 isothermal lines corresponding to the borders of nine divided temperature zones. First to ninth saturating circuits 71 to 79 similar to the aforementioned saturating circuits 25 to 27 are so controlled as to take out only those video signals corresponding to the ribbon-shaped portions defined by every two adjacent ones of said isothermal signals. Outputs from these saturating circuits 71 to 79 control the emission of electron beams from the three electron guns 39 to 41 corresponding to three primary colors. Output signals from the first, fourth and seventh saturating circuits 71, 74 and 77 pass through diodes 80, 81 and 82 respectively to operate and control the three electron guns 39 to 41. An image appearing on the screen which corresponds to the first temperature zone is indicated in a primary color of blue and similarly the images corresponding to the fourth and seventh temperature zones are presented in primary colors of green and red respectively.

Referring to an image corresponding to the second temperature zone, output signals from the second saturating circuit 72 pass through a circuit comprising a division resistor 83, diode 84, division resistor 85, and diode 86 so as to supply the electron guns 39 and 40 with actuating signals in voltage proportion of 2 to 1, namely presenting blue and green colors combined in the voltage ratio of 2 to 1. In exactly the same way, images corresponding to the fifth, sixth, eighth and ninth temperature zones are indicated in such hues as bearing the ratio of any two out of the three primary colors of blue, green and red.

The aforementioned modification enables the various parts of an image appearing on the screen, which correspond to the first to ninth temperature zones, to be exhibited in a combination of nine hues at the same time and also momentary minute changes in the temperature distribution pattern to be distinctly observed. Further it is possible easily to display at the same time 10 isothermal lines defining the borders of the respective temperature zones.

As mentioned above, the present invention causes various hues to be designated in advance in corresponding relationship to the respective temperature zones involved in a temperature distribution pattern to be displayed, thus making it possible immediately to observe by the eye the configuration of said pattern and the values of the respective temperature zones included therein. Particularly where a plurality of temperature zone are indicated by hue at the same time, their differences are disclosed extremely vividly, making it possible immediately to recognize the exact numerical values of these zones.

Further, the present invention allows a temperature distribution pattern to be displayed in the form of a hue image, and consequently to be preserved and reproduced in extremely exact truthfulness by means of color pictures. This is very effective in recording said pattern and also observing changes in a plurality of temperature zones involved in said pattern as it varies from time to time. The invention also permits a plurality of comparisons to be made at the same time with the desired or standard temperature distribution pattern, the results of such comparison to be easily associated with temperature control and consequently said control to be effectively carried out remotely or automatically.

What We claim is:

1. An apparatus for displaying a temperature distribution pattern comprising:

a. a television camera device having a sufficient sensitivity to heat rays radiated from a foreground subject within the range of its temperature to be detected and producing image signals corresponding to the respective temperature zones involved in the temperature distribution pattern of said subject;

b. a voltage generator for producing a plurality of reference voltage signals having different levels corresponding to predetermined temperatures to divide said image signals into the predetermined number of zone group signals including zone signals corresponding to said temperature zone;

c. a plurality of gate circuits each supplied with said image signals to be divided and one of said reference voltage signals to produce said zone group signals;

d. a plurality of saturating circuits comprising differential amplifiers for producing said zone signals corresponding to the difference between the respective adjacent zone group signals and, limiters for limiting the amplitude of outputs from the differential amplifiers;

e. video amplifiers for amplifying outputs from the saturating circuits; and f. means for displaying in different hues the temperature distribution pattern of said subject by supplying said video amplifier outputs to a color receiving tube.

2. An apparatus for displaying the temperature distribution pattern according to claim 1 wherein said displaying means comprises a plurality of diodes connected between the saturating circuits and video amplifiers, and division resistors so as to supply outputs from the saturating circuits to at least two video amplifiers in prescribed proportion and indicate desired hues in combination.

* * * * *